United States Patent [19]
Latella et al.

[11] Patent Number: 6,079,843
[45] Date of Patent: Jun. 27, 2000

[54] BARBECUE GRILL ARTIFICIAL LIGHTING APPARATUS

[76] Inventors: Demetrio Latella, 64 Roahook Rd., Cortlandt, N.Y. 10567; Nicholas Vila, 1110 Orange Turnpike, Monroe, N.Y. 10950

[21] Appl. No.: 09/271,223

[22] Filed: Mar. 17, 1999

[51] Int. Cl.[7] .............................. F21V 33/00; F24C 15/10
[52] U.S. Cl. ..................... 362/92; 362/133; 362/134; 362/179; 362/253; 362/458; 362/295; 362/802; 362/276; 126/213; 126/41 R
[58] Field of Search ................ 362/92, 133, 134, 362/179, 253, 458, 295, 802, 276; 126/213, 41 R

[56] References Cited

U.S. PATENT DOCUMENTS

| | | | |
|---|---|---|---|
| 543,779 | 7/1895 | Petersen | 362/93 |
| 598,941 | 2/1898 | Kolb | 362/93 |
| 711,931 | 10/1902 | Barenz | 362/93 |
| 3,524,980 | 8/1970 | Meloan | 362/93 |
| 4,029,079 | 6/1977 | Elder | 126/258 |
| 4,091,795 | 5/1978 | Wells | 126/258 |
| 5,257,169 | 10/1993 | Walendziak | 362/92 |
| 5,664,875 | 9/1997 | Hegedus | 362/191 |
| 6,012,442 | 1/2000 | Faraj | 126/19 R |

*Primary Examiner*—Sandra O'Shea
*Assistant Examiner*—Ronald E. DelGizzi
*Attorney, Agent, or Firm*—Arthur L. Plevy; Buchanan Ingersoll P.C.

[57] ABSTRACT

A lighting apparatus for a barbecue grill including a common gas supply, a grill pit, a grilling surface, and grill control means for regulating a flow of gas from the gas supply, the lighting apparatus including: a lighting enclosure including: a mounting bracket secured within the grill pit and extending outwardly therefrom, and, substantially transparent front closure means for sufficiently sealing a front of the lighting enclosure; and, lighting means positioned within the lighting enclosure and being responsive to the grill control means for illuminating the grilling surface.

20 Claims, 7 Drawing Sheets

6,079,843

BARBECUE GRILL ARTIFICIAL LIGHTING APPARATUS

FIELD OF INVENTION

The invention relates to lighting, and more particularly to a lighting apparatus for a gas-operated barbecue.

BACKGROUND OF INVENTION

Barbecue grilling is a popular method for cooking food. However, when natural lighting becomes dim, such as at night cooking on an outside barbecue grill becomes less desirable, as it is more difficult to see the grilling surface. Such drawbacks increase in the fall and winter months when daylight shortens and it gets dark earlier.

Several attempts have been made to overcome this drawback of barbecue grills. One such device is discussed in U.S. Pat. No. 3,524,980 entitled "Gas Light—Gas Grill Combination." The '980 device however is considerably larger than the gas grill thus making it undesirable in certain settings. Further, the '980 device is not portable as it is fixed in a single location, thus also making it undesirable in certain settings. Further yet, light generated by the '980 apparatus is undesirably cast upon the grilling surface only when the upper housing is open, thus rendering any windows in the upper housing for permitting an operator to view therethrough when closed, inoperable at night-time.

Another device aimed at resolving the aforementioned drawback of typical barbecue grills is disclosed in U.S. Pat. No. 5,257,169, entitled "Barbecue Grill Lighting Apparatus." However, the '169 device is positioned adjacent to an external handle coupled to the upper housing of the barbecue grill. Accordingly, such a device cannot be utilized with barbecue grills which do not have a hinged upper housing. Further, the '169 apparatus undesirably requires manual operation of a generator by a user, and can interfere with the handle to which it has been attached. Further, light generated by the '169 apparatus is again undesirably cast upon the grilling surface only when the upper housing is open, again rendering any windows in the upper housing for permitting an operator to view therethrough when closed, inoperable at nighttime. Also, the '169 device must be removed when not in use, or else be unprotected against the weather.

Yet another device intended to overcome lighting deficiency with barbecue grills is disclosed in U.S. Pat. No. 5,664,875, entitled "Barbecue Grill Light." However, the '875 device undesirably renders a portion of a platform board adjacent to the gas barbecue grill unusable. Further, light generated by '875 apparatus is again undesirably cast upon the grilling surface only when the upper housing is open, rendering any windows in the upper housing for permitting an operator to view therein when closed, inoperable at nighttime. Further, the '875 apparatus requires additional supply of electrical power to operate it. Also, the '875 device must be removed when not in use, or else be unprotected against the weather. All of these deficiencies again make the '875 device undesirable in certain circumstances.

Accordingly, it is an object of the present invention to sufficiently illuminate the cooking, or grilling, surface of a gas grill at night time such that an operator may utilize the gas grill with greater ease. It is a further object of the present invention to provide such illumination with an apparatus sufficiently protected from the weather such that when not in use it does not need to be removed. It is a further object of the invention that this apparatus be effective when a grill top is either open or closed, and that it can be adapted to a grill not having an upper housing. It is a further object of the invention that it not effect the portability of grills which have incorporated it.

SUMMARY OF THE INVENTION

A lighting apparatus for a barbecue grill including a gas supply, a grill pit, a grilling surface, and grill control means for regulating a flow of gas from the gas supply, the lighting apparatus including: a lighting enclosure including: a mounting bracket secured within the grill pit and substantially transparent front closure means for substantially sealing a front of the lighting enclosure; and, lighting means positioned within the lighting enclosure and being responsive to the grill control means for illuminating the grilling surface.

DETAILED DESCRIPTION OF INVENTION

It should be understood that the present invention can take the form of either an upgrade for an existing grill, an optional feature for a new grill or standard feature for a new grill.

Figure 1:
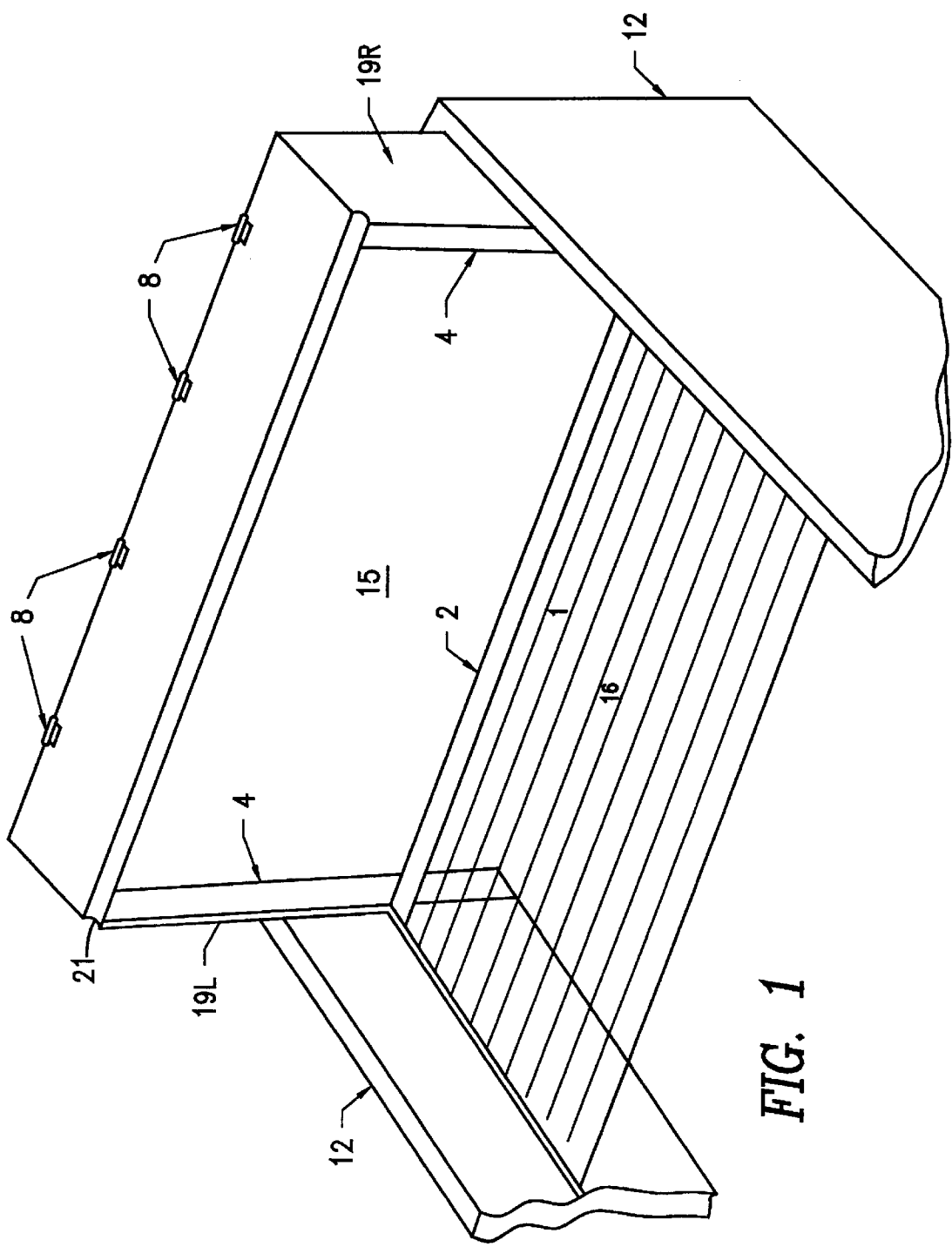
FIG. 1 illustrates a perspective view of a portion of a barbecue grill adapted with a lighting apparatus according to the present invention.

Referring now to the Figures, wherein like references refer to like elements of the invention, FIG. 1 illustrates a perspective view of a portion of a barbecue grill adapted with a lighting apparatus according to the present invention.

A typical barbecue grill includes a lower housing, or grill pit, 12 and may or may not include an upper housing, or lid (not pictured) hingedly attached to the grill pit 12. The heat source (IE. gas burners) are located within this grill pit 12 and below a grilling surface, or grate, 16. Food is placed upon the grilling surface 16 and hence above the heat source located within the grill pit 12 thus cooking it when the grill is operated.

Figure 2:
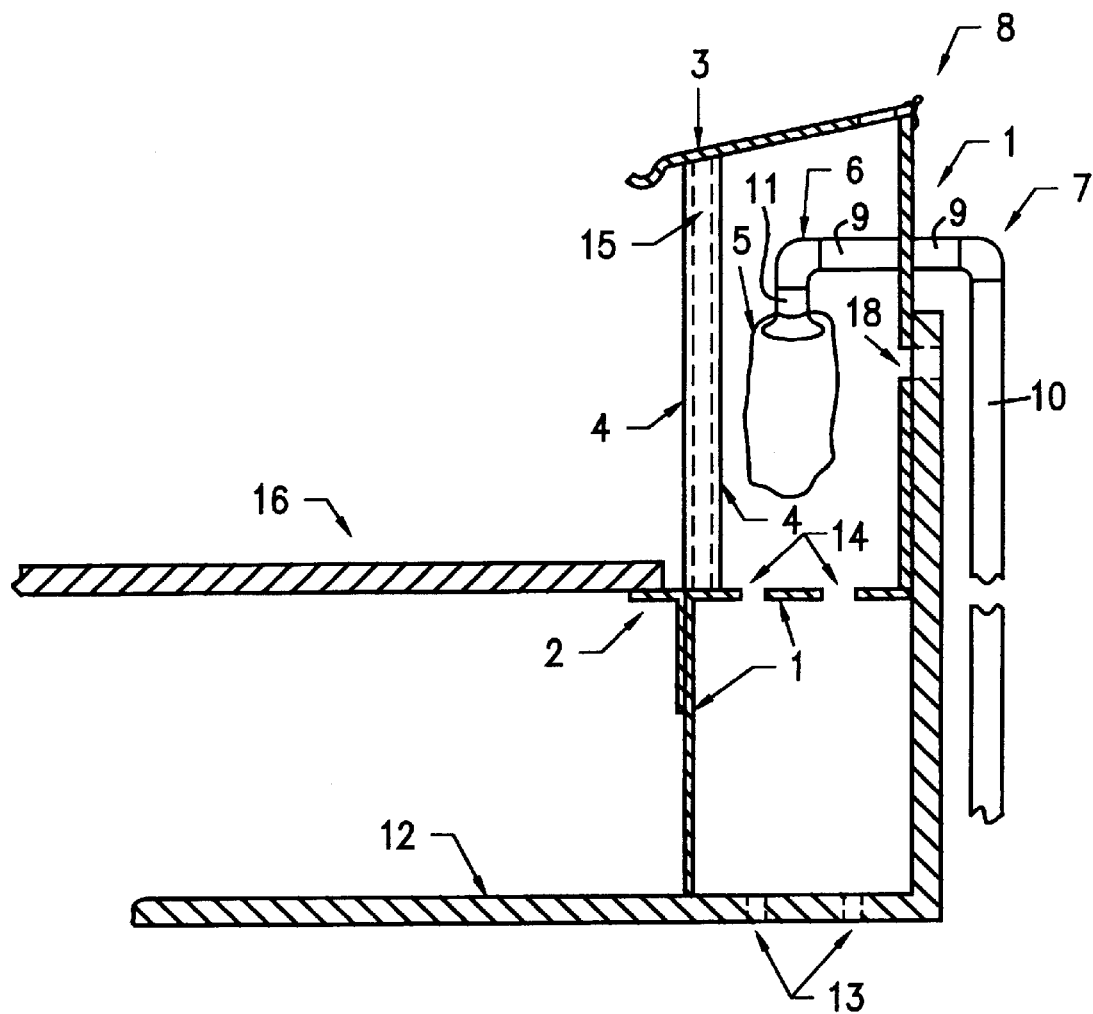
FIG. 2 illustrates a cross-section of a barbecue grill adapted with a lighting apparatus according to the present invention
Figure 3:
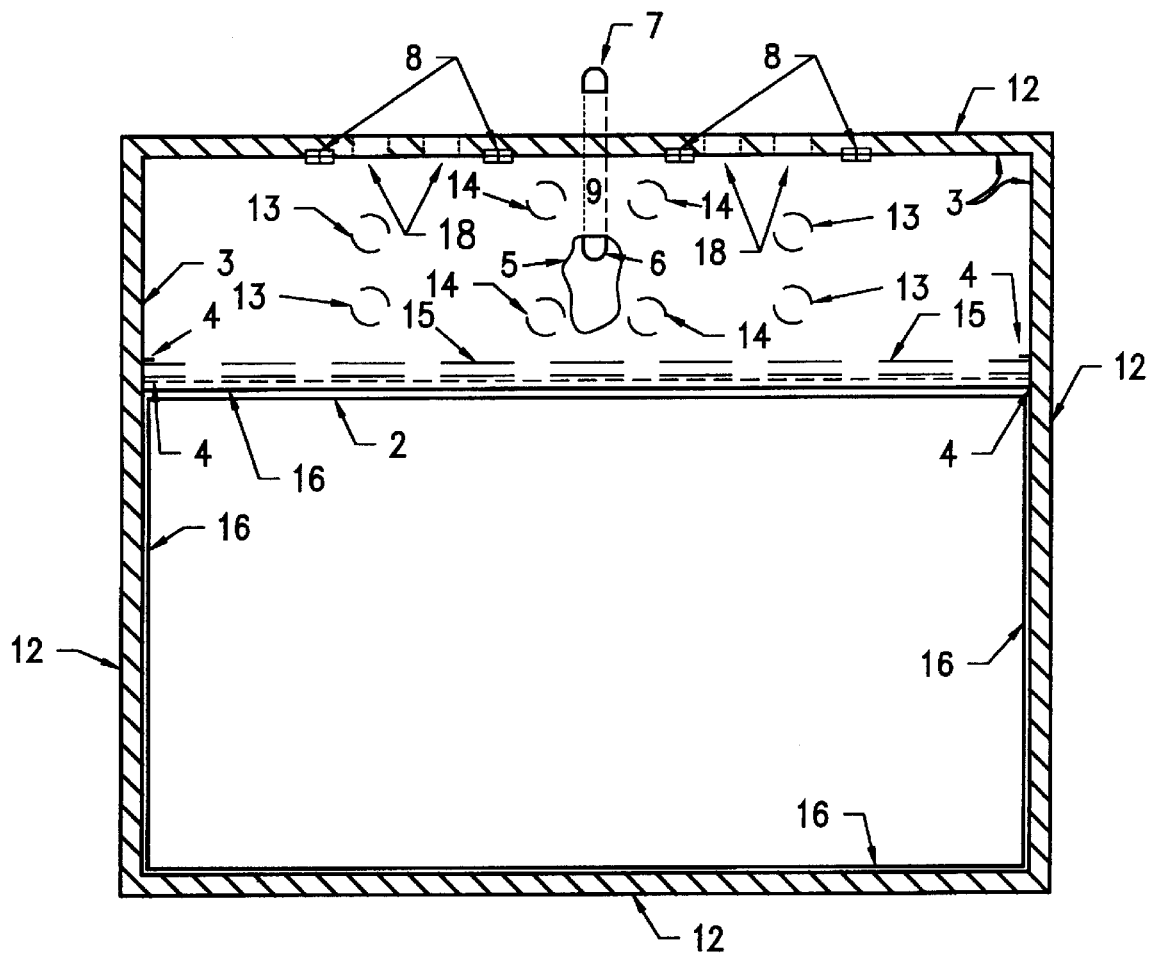
FIG. 3 illustrates a top view of a portion of a barbecue grill adapted with a lighting apparatus according to the present invention.
Figure 4:
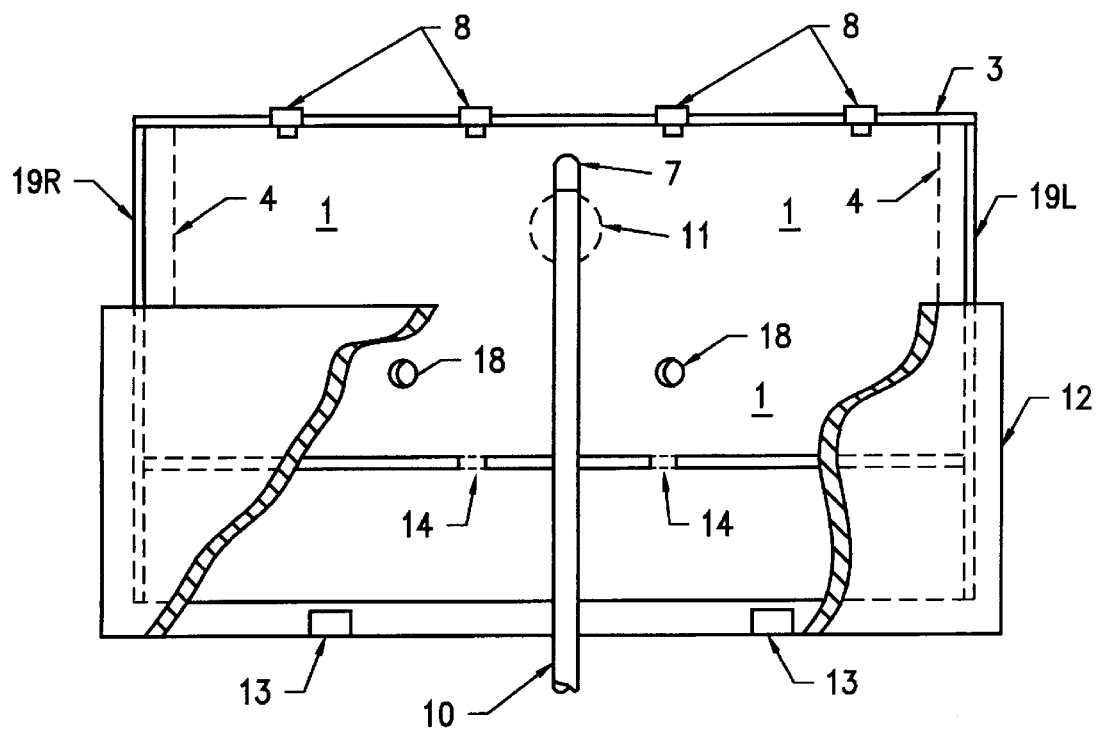
FIG. 4 illustrates a rear view of a portion of a barbecue grill adapted with a lighting apparatus according to the present invention.

Referring now also to FIGS. 2–4, the invention comprises a novel lighting source for illuminating the grilling surface 16 when natural lighting is insufficient.

The lighting source according to the present invention first comprises a mounting bracket 1, preferably being formed from a monolithic sheet of sheetmetal bent in opposite directions at 90° angles at predetermined lengths corresponding to the height and depth of the desired lighting enclosure 20 to be defined thereby. Preferably, these lengths are such that a light source 5 positioned within the enclosure 20 will be adjacent to the grilling surface 16, such that light will be cast thereupon when activated. The bracket 1 further serves to separate the heat source within the grill pit 12 from the light assembly and direct the heat therefrom towards the grilling surface 16.

Figure 5:
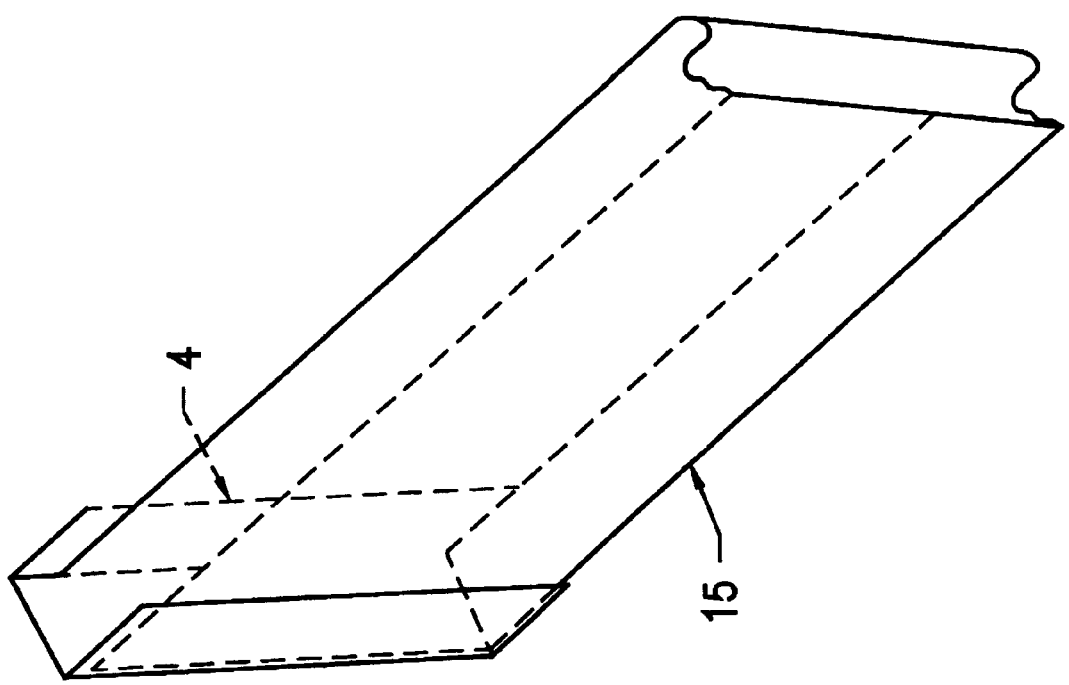
FIG. 5 illustrates the channels and window utilized according to the present invention.

The mounting bracket 1 is preferably secured within the grill pit 12 using any suitable conventional means (screws, spot welding, etc.) and serves to support the lighting enclosure 20 and define lower and rear wall portions thereof. Positioned adjacent to that portion of the mounting bracket 1 between the two 90° angles which defines the lower wall portion of the enclosure 20, a grill surface support bracket 2 is affixed, preferably by spot welding. The support bracket 2 serves as a support which the grilling surface 16 can rest upon within the grill pit 12. The top of the enclosure is defined by a hood 3 which is coupled using hinges 8 to the bracket 1, such that it can be hingedly opened for maintenance. The front of the enclosure 20 is defined by a substantially transparent window 15 held in position by retaining channels 4 located on each side thereof (see FIG. 5 also). The retaining channels 4 are preferably tapered from top to bottom to facilitate easier removal and insertion of the window 15 from the top. The window 15 is preferably a sheet of heat resistant, substantially transparent glass (such as a borosilicate glass like Pyrex). The sides of the lighting enclosure are defined by sides 19 (19L and 19R) preferably also formed from sheetmetal.

The enclosure further preferably includes venting apertures 14 and 18 through the mounting bracket 1 and apertures 13 through the grill pit 12. Such venting apertures permit for proper ventilation of the enclosure 20 and for the lighting source 5 contained therein.

Preferably, the lighting source 5 is a gas powered conventional mantel attached to the gas supply for the grill as is known to those possessing ordinary skill in the art. A control knob, like those conventionally included for controlling the gas burners, is used to control the flow of gas from the supply to the mantel 5, and hence operation thereof.

The mantel 5, when supplied with gas via the control knob, can be ignited using a standard piezoelectric igniter such as is well known in the art. The mantel 5 is coupled to a gas regulator which preferably responds to a control knob dedicated to the lighting apparatus as has been discussed, and further coupled to the gas supply for the grill as is well known to those having ordinary skill in the art. The mantel 5 for example can be coupled to the gas supply using supply line 10, elbow 7, nipples 9, elbow 6, and flare 11 or a single pipe.

Thus an operator of a grill incorporating a lighting apparatus according to the present invention needs only to take the common steps of turning the knob which opens a regulator between the gas supply and mantel 5, and press a switch electrically coupled to a piezoresistive igniter in order to ignite that gas escaping through the mantel 5. Upon successful completion of these steps the mantel 5 is arranged within the enclosure as has been described, in such a manner as to illuminate the grilling surface 16 of the barbecue grill thus making it easier to use when natural lighting becomes insufficient for cooking thereon.

In a particularly preferred embodiment the roof 3 is tilted forward over the grilling surface 16 and further includes a drip edge 21 at its bottom most edge. This drip edge 21 gathers drippings which have fallen onto the roof, for example from a warmer rack above the light such as is well known in the art. The drip edge acts to funnel those drippings collected therein to a side of the lighting enclosure and off into a collector such as a can. Preferably, this drip edge takes the form of a U channel.

Figure 6:
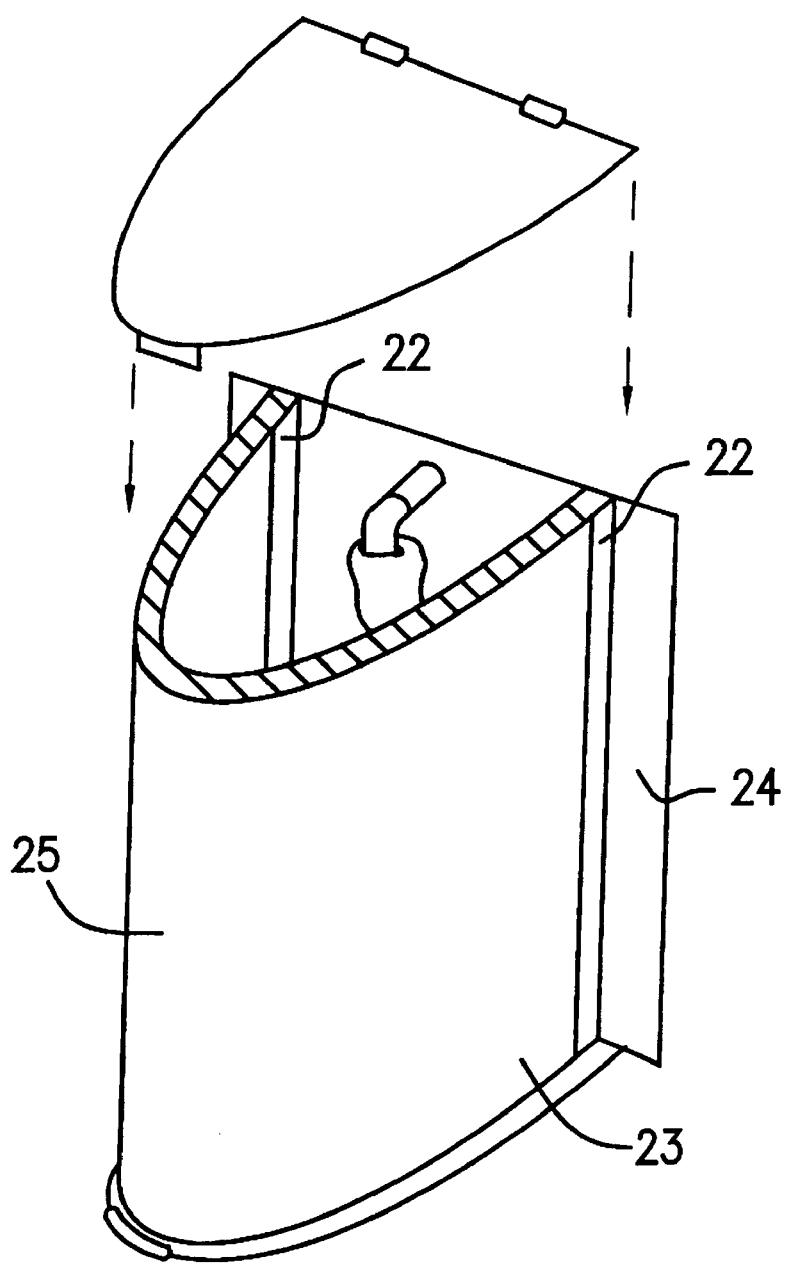
FIG. 6 illustrates a perspective view of an alternative embodiment of the present invention.

An alternative embodiment of the present invention is illustrated in FIG. 6. This alternative embodiment also uses two retaining channels 22 for securing the lighting enclosure 23 to an interior surface 24 of a wall of a grill pit. The lighting enclosure 23 again includes a transparent or translucent window 25 which in this case is semicircular or ovoidal in shape and is secured within the retaining channels 22. Such a shape allows for excellent light transmission onto a grilling surface from a mantel positioned within the lighting enclosure 23. A lip or other retaining channel 26 can be provided to secure the window 15' within the retaining channels 22.

As will be evident to one skilled in the art, the enclosure 23 preferably rests upon, or adjacent to, the grilling surface which it is intended to illuminate.

Figure 7:
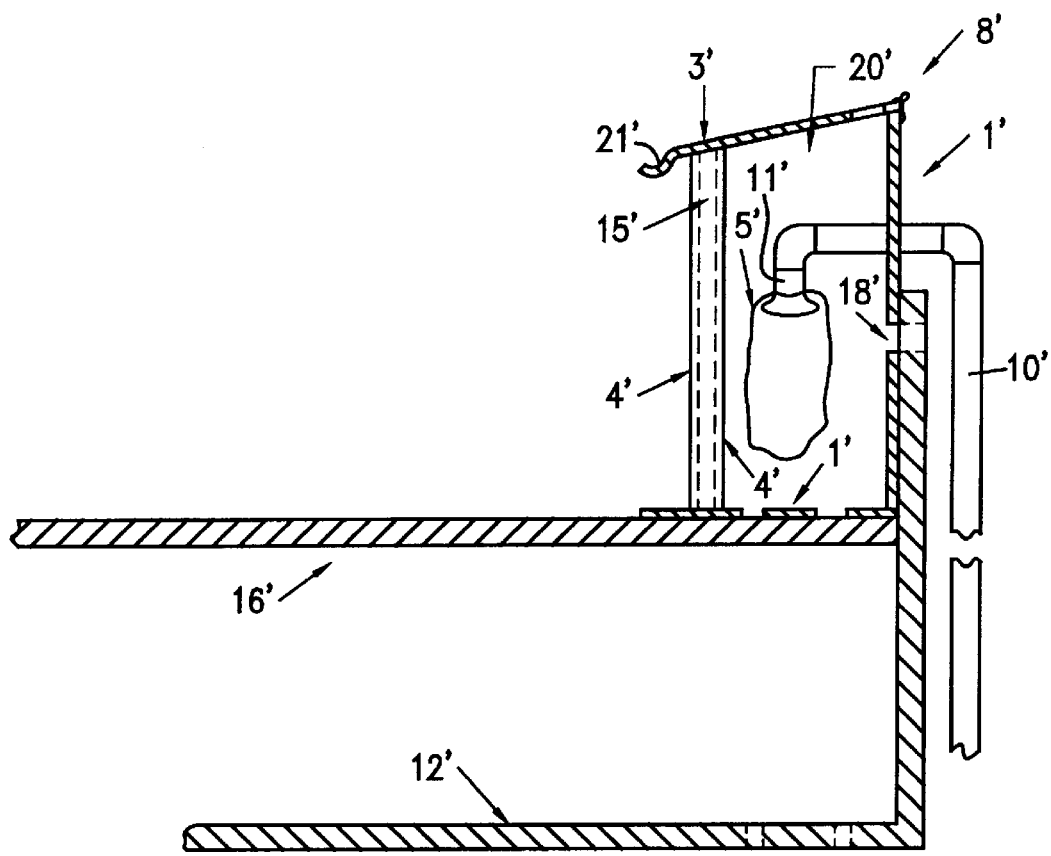
FIG. 7 illustrates a cross-section of a barbecue grill adapted with a further alternative embodiment of the lighting apparatus according to the present invention

Referring now to FIG. 7, therein is illustrated a further alternative embodiment of the present invention. Therein the mounting bracket 1' forms the rear and bottom walls of the lighting enclosure 20'. Like elements of the embodiment of FIG. 7 are designated identically to equivalent elements of the embodiment of FIG. 2 with the addition of a prime (') designator. As is evident from FIG. 7, in this alternative embodiment, the entire bracket assembly is positioned above the grilling surface 16', so that no modification to grilling surface, or grate, 16' is necessary for installation.

Further, it should be understood that the lighting enclosure (20,20') of any of the embodiments described herein may alternatively be designed such as not to extend out from, or above the grill pit (12,12'). Such a configuration may, in the case of particular gas grills allow for better sealing of a lid thereof.

Incorporating an apparatus according to the present invention into a typical gas grill provides better artificial illumination of the grilling surface 16 and hence easier use of the entire grill when natural lighting becomes insufficient to adequately illuminate the grilling surface.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A lighting apparatus for a barbecue grill comprising a gas supply, a grill pit, a grilling surface and grill control means for regulating a flow of gas from said gas supply, said apparatus comprising:

a lighting enclosure comprising a mounting bracket secured within said grill pit and substantially transparent front closure means; and, lighting means positioned within said lighting enclosure and being responsive to said grill control means for illuminating said grilling surface through said front closure means.

2. The apparatus of claim 1, wherein said mounting bracket comprises a piece of sheet metal.

3. The apparatus of claim 2, wherein said piece of sheet metal is bent primarily in at least one predetermined location at approximately 90°.

4. The apparatus of claim 1, wherein said lighting means comprises a mantel.

5. The apparatus of claim 4, wherein said grill control means comprises at least one gas regulator.

6. The apparatus of claim 5, wherein one of said at least one regulator is coupled between said mantel and said gas supply.

7. The apparatus of claim 1, further comprising at least one aperture in said lighting enclosure or grill pit for providing ventilation for said lighting means.

8. The apparatus of claim 7, wherein said enclosure further comprises:

left and right side walls; and, a support bracket coupled to said mounting bracket, said support bracket for supporting said grilling surface.

9. The apparatus of claim 1, wherein said enclosure further comprises a moveable hood hingedly attached to said mounting bracket.

10. The apparatus of claim 9, wherein said hood comprises drip means for collecting liquid gathering thereon.

11. The apparatus of claim 1, wherein said grill further comprising a grill lid hingedly attached to said grill pit to allow said grill to be open or closed, wherein said lighting means illuminates said grilling surface regardless of whether said lid is opened or closed.

12. The apparatus of claim 1, wherein said front closure means comprises a substantially transparent sheet of glass.

13. An improved barbecue grill comprising:

gas supply means;

regulator means coupled to said gas supply means for regulating the flow of gas from said gas supply means;

at least one gas burner coupled to said regulator means;

a grilling surface positioned above said at least one gas burner;

a lighting enclosure comprising a mounting bracket secured within said grill pit and a substantially transparent front closure means; and, lighting means for illuminating said grilling surface, wherein said lighting means are coupled to said regulator means, positioned within said lighting enclosure and responsive to said regulator means.

14. The grill of claim 13, wherein said mounting bracket comprises a piece of sheet metal bent approximately 90° in at least one predetermined location.

15. The grill of claim 14, wherein said regulator means are further coupled between said lighting means and said gas supply means.

16. The grill of claim 14, wherein said piece of sheet metal partially protrudes out from said grill pit.

17. The grill of claim 13, further comprising at least one aperture in said lighting enclosure or grill pit for providing ventilation for said lighting means.

18. The grill of claim 17, wherein said enclosure further comprises:

left and right side walls; and, a support bracket coupled to said mounting bracket, said support bracket for supporting said grilling surface.

19. The apparatus of claim 13, wherein said enclosure further comprises a moveable hood hingedly attached to said mounting bracket.

20. The grill of claim 19, further comprising a grill lid hingedly attached to said grill pit to allow said grill to be closed, wherein said lighting means illuminates said grilling surface regardless of whether said lid is opened or closed.

* * * * *